(12) United States Patent
McNamara et al.

(10) Patent No.: US 8,493,234 B2
(45) Date of Patent: Jul. 23, 2013

(54) DEVICES, SYSTEMS AND METHODS FOR DETECTING A TRAFFIC INFRACTION

(75) Inventors: Justin Michael Anthony McNamara, Atlanta, GA (US); John Potts Davis, III, Marietta, GA (US); Jay Daryl Rector, Loganville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 642 days.

(21) Appl. No.: 12/632,280

(22) Filed: Dec. 7, 2009

(65) Prior Publication Data

US 2011/0133952 A1    Jun. 9, 2011

(51) Int. Cl.
*G08G 1/09*    (2006.01)

(52) U.S. Cl.
USPC .......................................... 340/905; 340/901

(58) Field of Classification Search
USPC .......................................................... 340/905
See application file for complete search history.

(56) References Cited

U.S. PATENT DOCUMENTS

| | | | |
|---|---|---|---|
| 4,774,571 A | 9/1988 | Mehdipour | |
| 5,381,155 A | 1/1995 | Gerber | |
| 5,952,941 A * | 9/1999 | Mardirossian | 340/936 |
| 6,160,494 A | 12/2000 | Sodi | |
| 6,188,329 B1 | 2/2001 | Glier | |
| 6,384,740 B1 * | 5/2002 | Al-Ahmed | 340/936 |
| 6,690,294 B1 | 2/2004 | Zierden | |
| 6,959,282 B2 | 10/2005 | Kakhihara | |
| 7,106,212 B2 | 9/2006 | Konishi | |
| 2003/0016143 A1 * | 1/2003 | Ghazarian | 340/901 |
| 2004/0222904 A1 * | 11/2004 | Ciolli | 340/937 |
| 2006/0214783 A1 * | 9/2006 | Ratnakar | 340/505 |
| 2008/0238719 A1 * | 10/2008 | Marchasin et al. | 340/901 |
| 2009/0210141 A1 | 8/2009 | Young | |
| 2010/0053328 A1 * | 3/2010 | Lemire | 348/148 |

* cited by examiner

*Primary Examiner* — Kerri McNally
(74) *Attorney, Agent, or Firm* — Hartman & Citrin LLC

(57) ABSTRACT

Devices, systems, and methods are disclosed for identifying a driver within a vehicle using short range wireless communication in order to ticket or alert the driver in response to a traffic infraction by the driver. In exemplary embodiments, a short range wireless communication device registers drivers of vehicles at a certain location. The registration captures a unique identifier for each driver at the location from the driver's wireless communication device. When a vehicle commits a traffic infraction, the unique identifier is used to reference a database to determine the identity and address of the driver. The driver may then be sent a notification of the infraction as well as payment options. This notification may be sent directly to the wireless communication device of the driver. In embodiments of the present invention, a smart vehicle acts as a proxy to capture the unique identifier from the driver's wireless communication device and communicates with the short range wireless communication device.

15 Claims, 11 Drawing Sheets

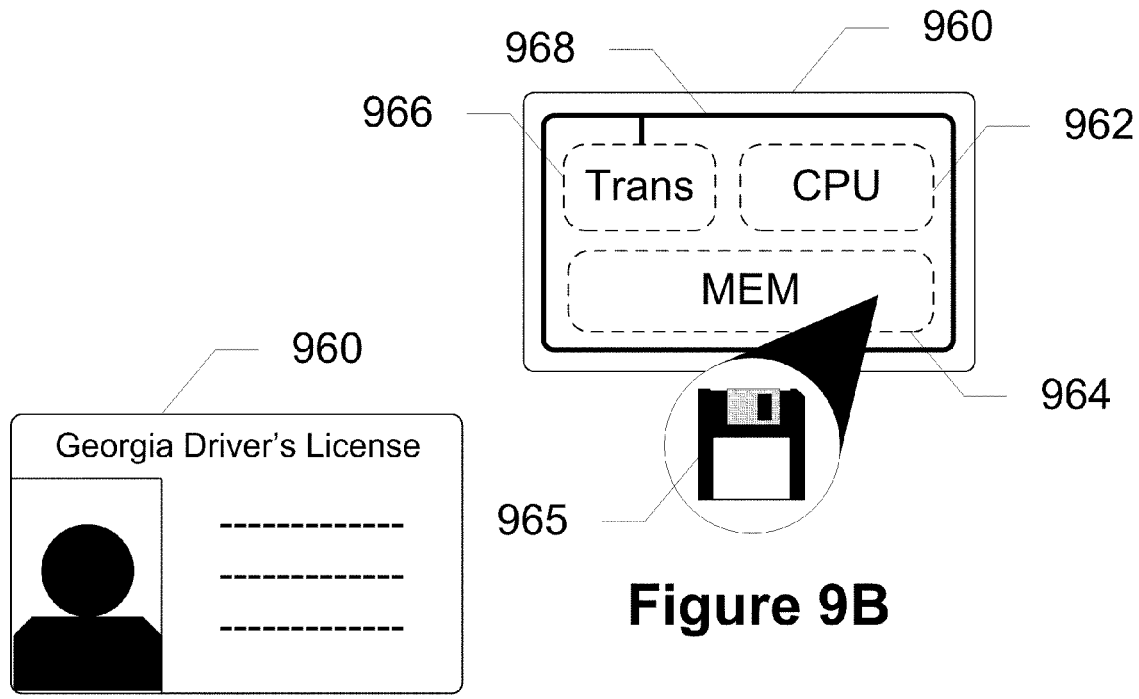
Figure 9A
Figure 9B
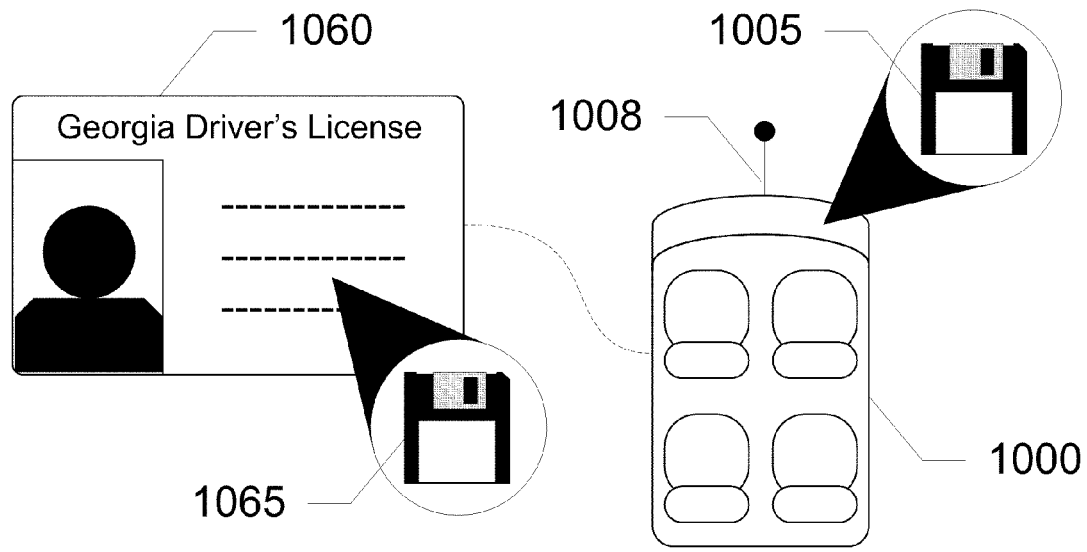
Figure 10

DEVICES, SYSTEMS AND METHODS FOR DETECTING A TRAFFIC INFRACTION

BACKGROUND OF THE INVENTION

1. Field of the Invention

The present invention relates to vehicle driver identification. More specifically, the present invention relates to detecting via a wireless communication device when the driver has committed a traffic infraction.

2. Background of the Invention

Currently intersection cameras take a picture of a car when a car runs a red light. When this occurs, the fine for the infraction is sent to the owner of the car. However, the owner of the car was not necessarily the driver during the infraction. Owners may argue that they were not even in the car during the period of time of the incident.

The owner of the car involved in the infraction is notified of the infraction by receiving pictures in the mail of the incident. These pictures include pictures from the front or overhead showing the red light and a picture from the back which is a close up of the car's license plate. Municipalities use the license plate to figure out an address to send the ticket to. However, these pictures are often fuzzy and a clear identification of a driver can rarely be made. Unfortunately for the driver, getting out of the ticket would require going to court and showing, for instance, that he or she was not driving the car.

Present-day technology can alleviate many of the problems concerning driver identification and notification. Notably, microelectronic devices are becoming more and more ubiquitous. By coupling processors, memories, and transceivers to these devices, almost any handheld object can become a wireless communication device capable of transmitting and receiving data over a network. It is easy to set up a personal-area network with a few such devices incorporated into various everyday objects. However, this functionality is currently not being exploited to its full level.

What is needed is a means for identifying a driver who committed a traffic infraction and notifying the driver of the traffic infraction.

SUMMARY OF THE INVENTION

The present invention addresses the above-identified issues by providing devices, systems, and methods for identifying a driver within a vehicle using short range wireless communication in order to ticket or alert the driver in response to a traffic infraction by the driver. In exemplary embodiments, a short range wireless communication device registers drivers of vehicles at a certain location. The registration captures a unique identifier for each driver at the location from the driver's wireless communication device. When a vehicle commits a traffic infraction, the unique identifier is used to reference a database to determine the identity and address of the driver. The driver may then be sent a notification of the infraction as well as payment options. This notification may be sent directly to the wireless communication device of the driver. In embodiments of the present invention, a smart vehicle acts as a proxy to capture the unique identifier from the driver's wireless communication device and communicates with the short range wireless communication device.

In one exemplary embodiment, the present invention is a system for notifying a driver. The system includes a network; an infraction detector in communication with the network, the infraction detector for determining a traffic infraction by a vehicle and recording information concerning the traffic infraction; a wireless communication device in communication with the infraction detector; an infraction server on the network, the infraction server including a user account for a user of the wireless communication device corresponding to a unique identifier of the wireless communication device, the user account including an address of the user; an infraction logic on the infraction detector to retrieve the unique identifier from the wireless communication device, pair the unique identifier with the information concerning the traffic infraction, and transmit the unique identifier and details of the traffic infraction to the infraction server; and a server logic on the infraction server to associate the unique identifier with the user account, determine the address for the user, and send a notification of the traffic infraction to the address.

In another exemplary embodiment, the present invention is a method for notifying a driver, the method including requesting a unique identifier from a wireless communication device; receiving the unique identifier from the wireless communication device; determining a vehicle has committed a traffic infraction; correlating the vehicle with the unique identifier; determining an identity of a driver in possession of the wireless communication device and an address driver based upon the unique identifier; and notifying the driver of the traffic infraction.

In yet another exemplary embodiment, the present invention is an infraction detector, including a sensor; a processor in communication with the sensor; a memory in communication with the processor; a transceiver in communication with the processor; an antenna coupled to the transceiver; and an infraction logic on the memory to retrieve a unique identifier from a wireless communication device via the antenna and transceiver, determine a traffic infraction through inputs from the sensor; correlate the unique identifier with the traffic infraction; and send the unique identifier and traffic infraction to an infraction server. The infraction server determines a user of the wireless communication device and an address for the user based upon the unique identifier and sends a notification to the user

BRIEF DESCRIPTION OF THE DRAWINGS

FIGS. 9A and 9B show a contactless smart card embedded in a driver's license, according to an exemplary embodiment of the present invention.

FIG. 10 shows a smart vehicle detecting a driver's license, according to an exemplary embodiment of the present invention.

DETAILED DESCRIPTION OF THE INVENTION

Figure 1:
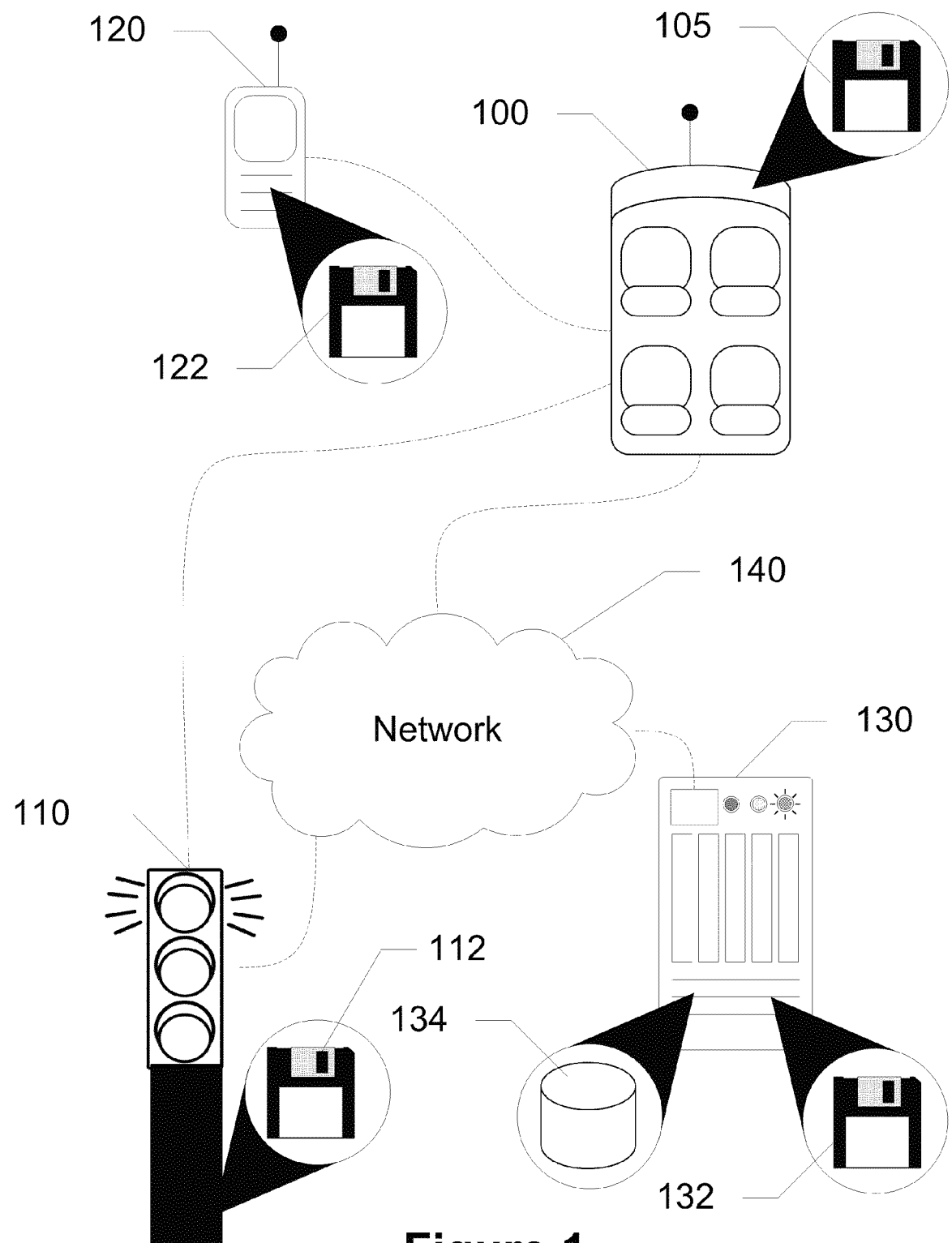
FIG. 1 shows a system for notifying a driver of a traffic infraction, according to an exemplary embodiment of the present invention.

The following detailed description discloses devices, systems, and methods for identifying a driver within a vehicle using short range wireless communications in order to ticket or alert the driver in response to a traffic infraction by the driver. In exemplary embodiments, a short range wireless communication device registers a driver of a vehicle at a certain location. The registration captures a unique identifier for the driver at the location from the driver's wireless communication device. When a vehicle commits a traffic infraction, the unique identifier is used to reference a database to determine the identity and address of the driver. The driver may then be sent a notification of the infraction as well as payment options. This notification may be sent directly to the wireless communication device of the driver. In embodiments of the present invention, a smart vehicle acts as a proxy to capture the unique identifier from the driver's wireless communication device and communicates with the short range wireless communication device.

"Wireless communication device", as used herein and throughout this disclosure, refers to any electronic device capable of wirelessly sending and receiving data. A wireless communication device may have a processor, a memory, a transceiver, an input, and an output. Examples of such devices include cellular telephones, personal digital assistants (PDAs), portable computers, etc. A wireless communication device also includes smart cards, such as contactless integrated circuit cards (CICC). The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Wireless communication devices communicate with each other and with other elements via a network, for instance, a wireless network, or a wireline network. A "network" can include broadband wide-area networks, local-area networks, and personal area networks. Communication across a network is preferably packet-based; however, radio and frequency/amplitude modulations networks can enable communication between communication devices using appropriate analog-digital-analog converters and other elements. Examples of radio networks include WiFi and BLUETOOTH® networks, with communication being enabled by hardware elements called "transceivers." A CICC, for instance, has an RFID transceiver. Wireless communication devices may have more than one transceiver, capable of communicating over different networks. For example, a cellular telephone can include a GPRS transceiver for communicating with a cellular base station, a WiFi transceiver for communicating with a WiFi network, and a BLUETOOTH® transceiver for communicating with a BLUETOOTH® device. A network typically includes a plurality of elements that host logic for performing tasks on the network.

In modern packet-based wide-area networks, servers may be placed at several logical points on the network. Servers may further be in communication with databases and can enable communication devices to access the contents of a database. An infraction server is an example of such a server. An infraction server can include several network elements, including other servers, and is part of a network, for example, a cellular network. An infraction server hosts or is in communication with a database hosting an account for a user of a wireless communication device. The "user account" includes several attributes for a particular user, including a unique identifier of the wireless communication device(s) owned by the user, an identity of the user, an address or addresses of the user, and other information.

A "vehicle," as used herein and throughout this disclosure, includes cars, trucks, and buses, as well as aircrafts and watercrafts.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1 shows a system for notifying a driver of a traffic infraction, according to an exemplary embodiment of the present invention. In this embodiment, the system includes a smart vehicle 100 with a client logic 105, a wireless communication device 120 with a wireless logic 122, a network 140, an infraction detector 110 with an infraction logic 112, and an infraction server 130 with a server logic 132 and a database 134. Smart vehicle 100 is in communication with wireless communication device 120, with infraction detector 110, and with infraction server 130 over network 140. Smart vehicle 100 is also in communication with infraction detector 110 through short range wireless communications, such as BLUETOOTH, ZIGBEE, NFC, WiFi, etc. Wireless communication device 120 is shown outside smart vehicle 100 for purposes of showing the flow of communication only. It is to be understood that wireless communication device 120 is used by the driver of smart vehicle 100. Wireless communication device 120 may be, for instance, a cellular telephone or a contactless smart card. Smart vehicle 100 transmits a request to wireless communication device 120, and wireless logic 122 responds with a unique identifier of wireless communication device 120. In the case of a cellular telephone, the unique identifier may be an MSISDN, IMSI, MAC address, etc. In the case of a contactless smart card, the unique identifier can be any alphanumeric, hexadecimal, or other unique string of characters. Client logic 105 on smart vehicle 100, via an antenna and transceiver, receives the unique identifier from wireless communication device 120 and transmits the unique identifier to infraction detector 110 to register the driver with infraction detector 110. Client logic 105 transmits the unique identifier to infraction detector 110 via the antenna and transceiver using short range wireless communications. For instance, this may be using BLUETOOTH, ZIGBEE, NFC, WiFi, infrared (IR), etc.

In the event of a traffic infraction by smart vehicle 100, infraction detector 110 detects the infraction. This may be through a camera or sensor on infraction detector 110 determining smart vehicle 100 is traveling through a red light, through a stop sign, above the posted speed limit, without headlights on at night, etc. For instance, the sensor may be a Doppler radar unit which detects a speed of the vehicle. Infraction logic 112 determines, for instance, whether or not the detected speed exceeds the maximum allowed speed at that location, as well as other traffic infractions. Infraction logic 112 correlates the sensed infraction with the unique identifier of the driver and transmits this and any other relevant information, such as photographs of the infraction, to infraction server 130 via network 140. This transmission may occur via WiFi, GPRS, or other protocols capable of communicating such information across a wide-area network such as the Internet. This transmission may occur wirelessly or through a wired connection to the network or directly to infraction server 130. Infraction server 130 includes database 134 storing driver information in a user account associated with the unique identifier from wireless communication device 120. Driver information may include a name of the driver, a social security number, a customer number, a telephone number, a physical address, electronic or email addresses, bank account information, etc. Server logic 132 matches the unique identifier with corresponding driver information from the user account on database 134 of infraction server 130. With the driver information determined, the driver who committed the infraction is notified of the infraction via wireless communication device 120. This notification may be a text message, telephone call, e-mail, etc. The notification may include the specific infraction, fines, payment information, etc.

A smart vehicle is not necessary for the system, but essentially works as a proxy for the wireless communication device of the driver. In exemplary embodiments of the present invention, the infraction detector communicates directly with the wireless communication device. The infraction detector registers each wireless communication device within a location directly, rather than through a smart vehicle. The communication is similarly through short range wireless communication, such as BLUETOOTH, NFC, ZIGBEE, WiFi, infrared (IR), etc. In some embodiments the infraction detector communicates with the smart vehicle to read the speed according to a speedometer coupled to the smart vehicle.

In other exemplary embodiments of the present invention, the infraction server is located adjacent to or is coupled to the infraction detector. In these embodiments, the communication between the two may be a wired or wireless communication. If the wireless communication device remains in range, then notifications may be sent directly to the wireless communication device through short range wireless communication.

In further embodiments of the present invention, the driver information may be stored on the driver's wireless communication device or on the memory of the smart vehicle. In these embodiments, the driver information may be uploaded from the infraction server to the driver's wireless communication device or the smart vehicle's memory. Alternatively, the driver information may be directly set to the wireless communication device or smart vehicle. This allows the infraction detector to instantly correlate the driver information with the infraction such that a notification may be sent to the driver from the infraction detector, rather than sending the unique identifier to the infraction server to first determine an identity and address of the driver.

Figure 2:
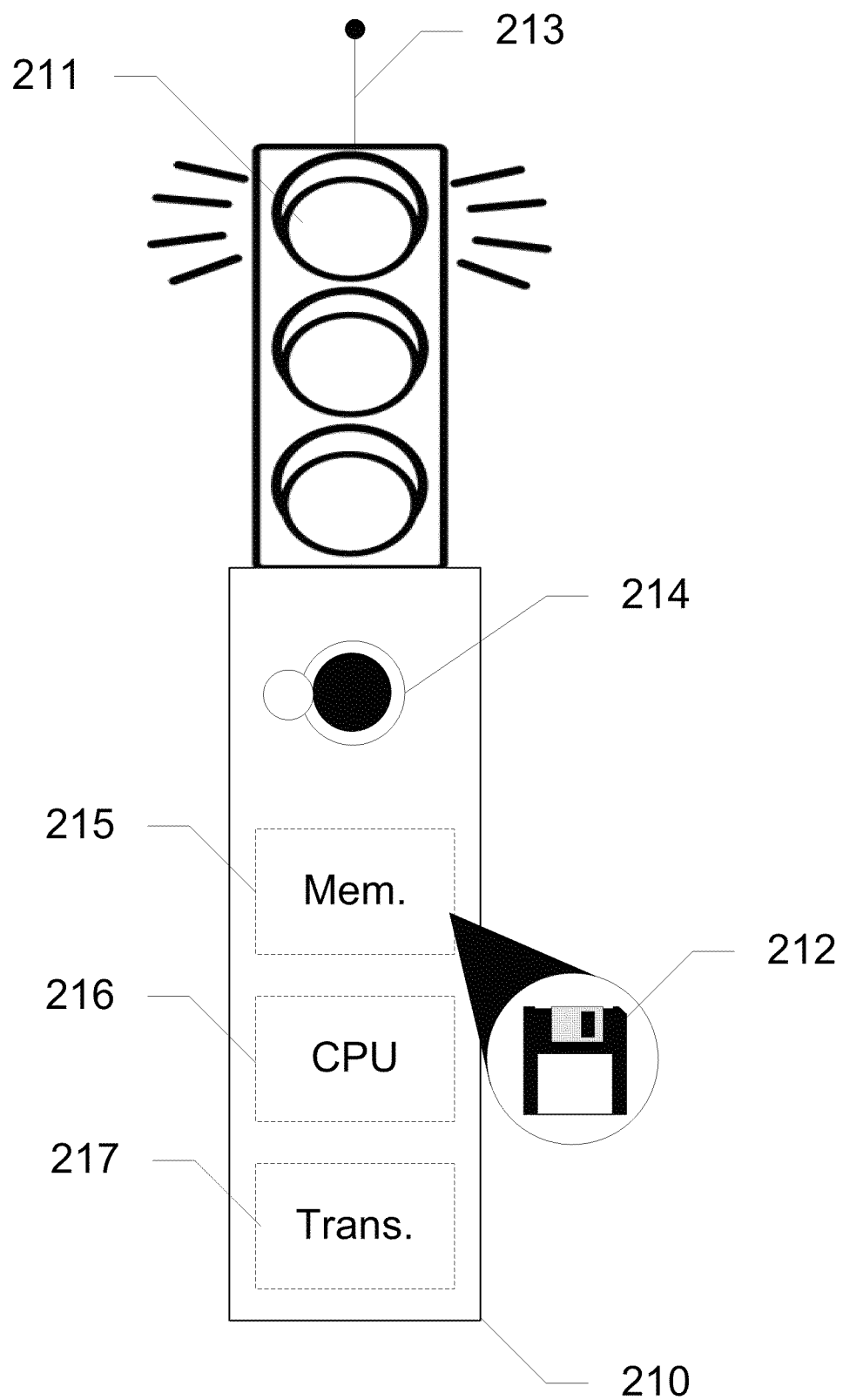
FIG. 2 shows an infraction detector, according to an exemplary embodiment of the present invention.

FIG. 2 shows an infraction detector 210, according to an exemplary embodiment of the present invention. Infraction detector 210 is preferably placed in close proximity to a roadway, such as at an intersection of two roads. The proximity to the roadway allows infraction detector 210 to detect infractions by vehicles and communicate with wireless communication devices within the vehicles using short range wireless communications. In this embodiment, infraction detector 210 includes a traffic light 211, a sensor 214, a memory 215 with an infraction logic 212, a central processing unit (CPU) 216, a transceiver 217, and an antenna 213. Transceiver 217 allows infraction detector 210 to wirelessly communicate with other devices, for instance a smart vehicle, the infraction server on a network, other wireless devices, and so on. This communication may be through cellular radio frequency (RF) signals, WiFi, BLUETOOTH, infrared (IR), ZIGBEE(™), etc. Antenna 213 is a transducer designed to transmit or receive electromagnetic waves. When a vehicle is within a location, a wireless communication device within the vehicle registers with infraction detector 210 via antenna 213 and transceiver 217. This allows infraction detector 210 to pair a unique identifier of the wireless communication device with the vehicle. The vehicle and unique identifier may be determined to correspond to each other using sensor 214, antenna 213, etc. For instance, the determination of a corresponding vehicle and unique identifier may be determined via a proximity measurement derived from signal strength, delay, or other measurements from antenna 213 paired with sensor 214, such as where sensor 214 is a camera. Traffic light 211 is a signaling device to control competing flows of traffic. Traffic light 211 is in communication with CPU 216 to notify CPU 216 of the state of traffic light 211, the state of traffic light 211 being a red, yellow, or green light. For instance, when traffic light 211 becomes red, infraction detector may alert sensor 214 to begin sensing vehicles running through the red light. Sensor 214 may be an optical sensor, such as a camera; a speed sensor, such as a Doppler radar unit; etc. Sensor 214 is in communication with CPU 216 to notify CPU 216 of detected vehicles, etc. CPU 216 commands components of infraction detector 210 according to infraction logic 212 on memory 215. Infraction logic 212 includes instructions for registering vehicles within range of infraction detector 210. Infraction logic 212 also includes rules for a particular intersection or location, including, for instance, a maximum speed allowed. Thus, if a vehicle is exceeding the maximum speed, sensor 214 detects the speed and infraction logic 212 determines the detected speed is in excess of the allowed maximum speed. This may trigger communication with an infraction server. If a vehicle travels through a red light, sensor 214 may take a picture of the vehicle. This picture is sent to CPU 216 to be paired with the vehicle. If the vehicle commits a traffic infraction, as determined by sensor 214, CPU 216, and infraction logic 212, the unique identifier and information concerning the infraction are sent to the infraction server for processing.

In embodiments of the present invention, a driver's wireless Communication device may be paired with a smart vehicle before being registered with the infraction detector. This may be useful in instances where there are multiple devices within the vehicle, in order to amplify wireless signals, etc. In these embodiments, the smart vehicle is used to communicate between the driver's wireless communication device and the infraction detector. More information about a smart vehicle can be found in commonly owned U.S. patent application Ser. No. 12/632,375, which is hereby incorporated by reference in its entirety.

Figure 3:
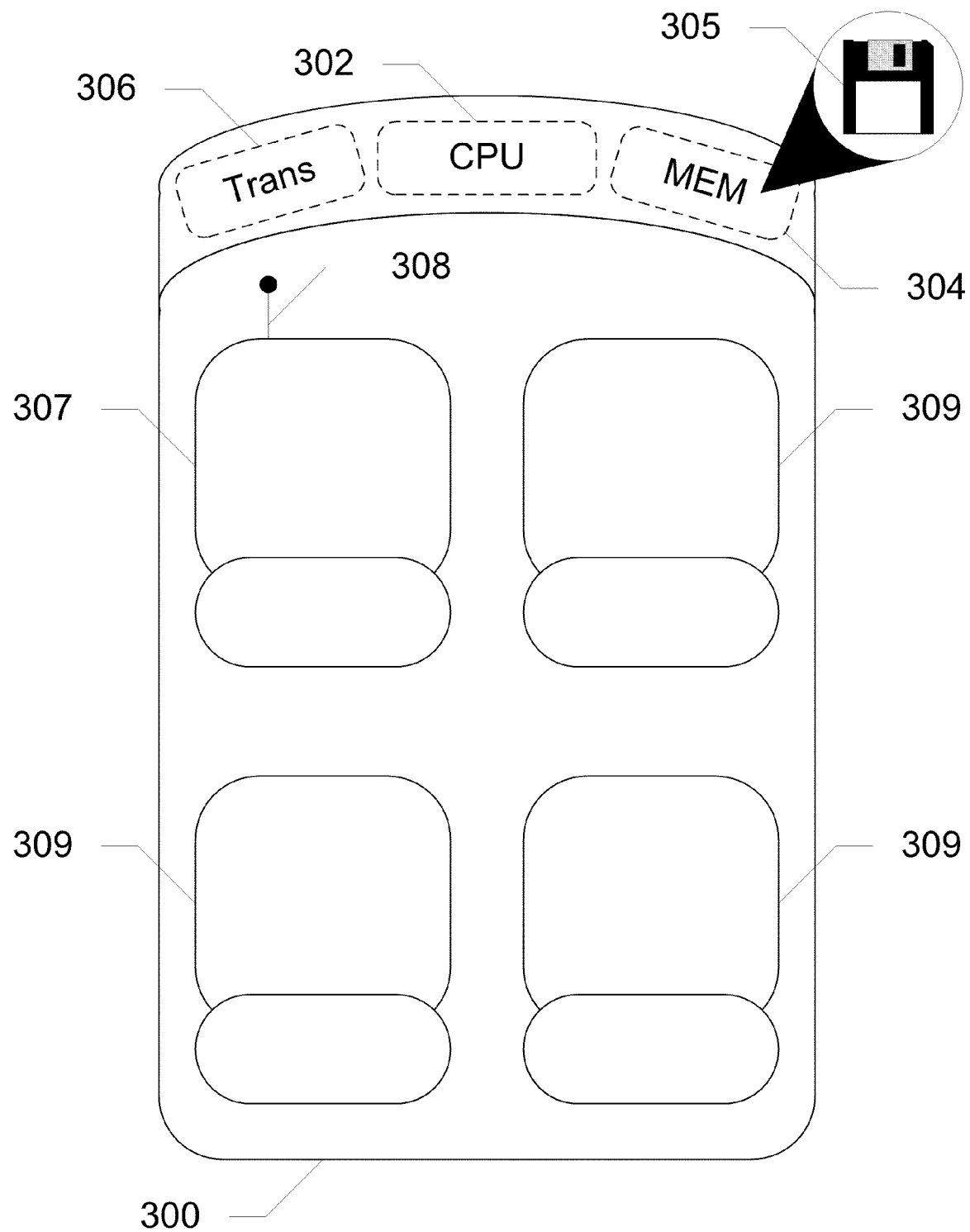
FIG. 3 shows a smart vehicle, according to an exemplary embodiment of the present invention.

FIG. 3 shows a smart vehicle 300, according to an exemplary embodiment of the present invention. In this embodiment, smart vehicle 300 is a vehicle which includes a central processing unit (CPU) 302, a memory 304 storing client logic 305, a transceiver 306, an antenna 308, a driver seat 307, and passenger seats 309. The vehicle can be any car, truck, motorcycle, boat, or aircraft. CPU 302 commands components of smart vehicle 300 according to client logic 305 on memory 304. Transceiver 306 allows smart vehicle 300 to wirelessly communicate with other devices on a network, for instance a personal area network within smart vehicle 300, an infraction server on a network, an infraction detector, other wireless devices, etc. This communication may be through cellular radio frequency (RF) signals, WiFi, BLUETOOTH™, NFC, infrared (IR), ZIGBEE™, etc. Antenna 308 is a transducer designed to transmit or receive electromagnetic waves.

The determination of a driver versus a passenger and the receipt of a unique identifier from the driver's wireless communication device are performed by smart vehicle 300, in this exemplary embodiment, as follows. Transceiver 306, via antenna 308, detects the presence of wireless communication devices located within smart vehicle 300. At least the driver of smart vehicle 300 carries with them a wireless communication device such as a cellular telephone or a contactless smart card. The driver's wireless communication device is able to transmit a unique identifier corresponding to a user account for the driver. In the case of a cellular telephone, the unique identifier may be an MSISDN, IMSI, MAC address, etc. In the case of a contactless smart card, the unique identifier can be any alphanumeric, hexadecimal, or other unique string of characters. Using short range wireless communications, such as BLUETOOTH or any other near-field communication (NFC), antenna 308 transmits a request for the unique identifier from the driver's wireless communication devices within range of antenna 308. The driver's wireless communication device responds with the unique identifier. Client logic 305 retrieves the unique identifier from the driver's wireless communication device and registers the unique identifier with an infraction detector via transceiver 306 and a vehicle antenna.

In many instances, more than one wireless communication device may be located within smart vehicle 300. The determination of a driver versus a passenger may be determined via a proximity measurement derived from signal strength, delay, or other measurements from antenna 308. For instance, antenna 308 may be located closer to driver seat 307 than passenger seats 309 such that the driver's wireless communication device has the strongest communication link to antenna 308, along with the shortest delay. Therefore, a driver is easily determined by placing antenna 308 significantly closer to the driver than any passenger. This ensures that antenna 308 perceives a measurable difference between signals from the driver and signals from a passenger.

Figure 4:
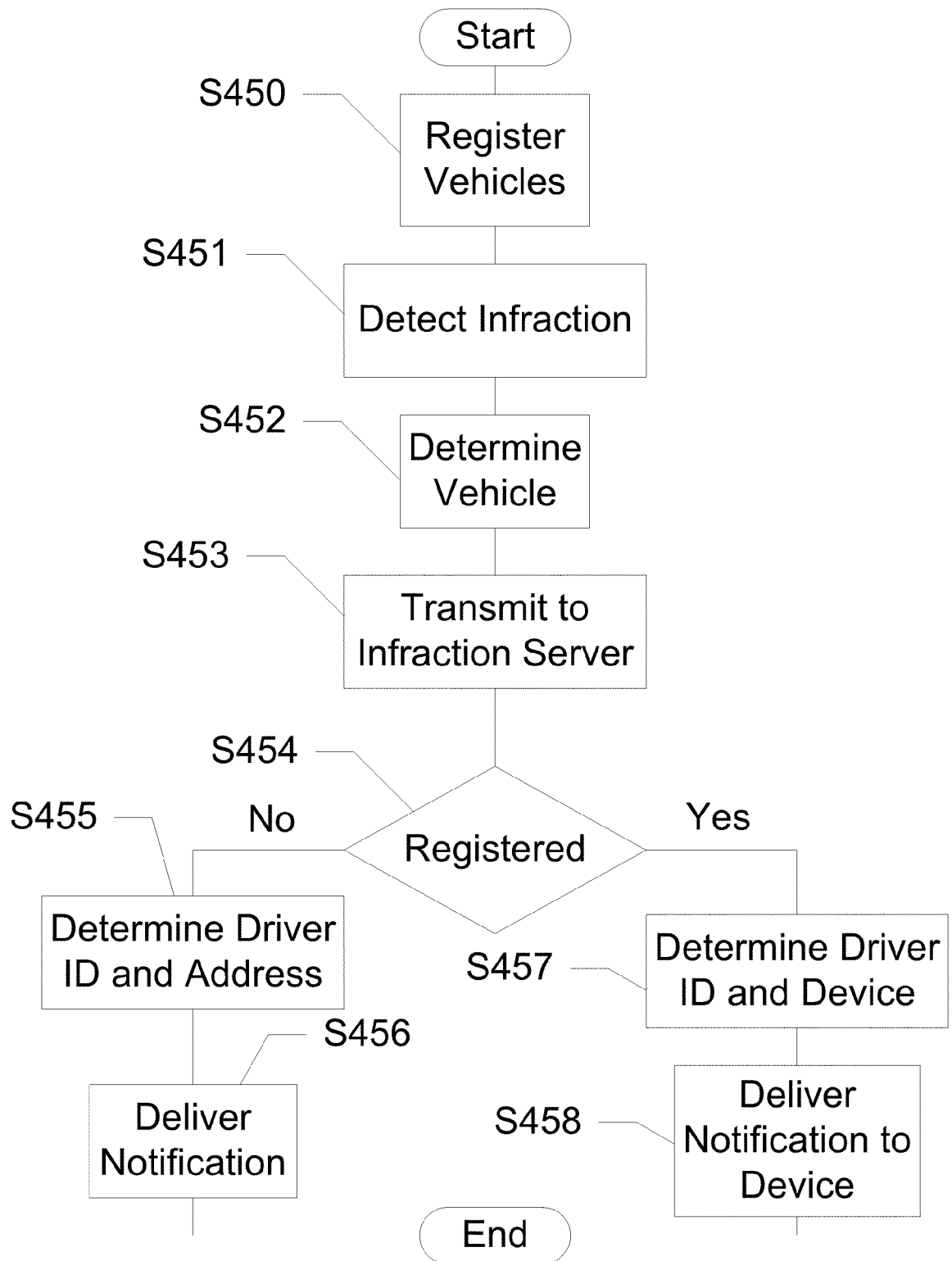
FIG. 4 shows a method of notifying a driver of a traffic infraction, according to an exemplary embodiment of the present invention.

FIG. 4 shows a method of notifying a driver of a traffic infraction, according to an exemplary embodiment of the present invention. In this embodiment, the method begins with an infraction detector registering vehicles S450. The registration occurs through communicating with a wireless communication device of the driver of the vehicle to gain a unique identifier of the wireless communication device, and pairing the unique identifier with the vehicle. The communicating may be through any form of short range wireless communication, such as BLUETOOTH, NFC, ZIGBEE, infrared (IR), a personal area network, WiFi, etc. The wireless communication device may be a device such as a cellular telephone, a contactless smart card, etc. The communication occurs as the vehicle comes within proximity of the infraction detector. The infraction detector communicates with the wireless communication device, or with a smart car as a proxy for the wireless communication device, using short range wireless communication to request the unique identifier for the driver's wireless communication device. In the case of a cellular telephone, the unique identifier may be an MSISDN, IMSI, MAC address, etc. In the case of a contactless smart card, the unique identifier can be any alphanumeric, hexadecimal, or other unique string of characters. With the vehicle registered, the infraction detector detects a traffic infraction by the vehicle S451. The traffic infraction may be, for instance, traveling through a red light, failing to stop at a stop sign, traveling above a maximum speed, etc. After the traffic infraction is detected, the infraction detector determines the vehicle which committed the infraction S452. This determination may use sensors on the infraction detector, such as a camera, transceivers, and antennas to determine the location of registered vehicles at the time of the traffic infraction, etc. The unique identifier of the driver of the vehicle is paired with information concerning the traffic infraction and sent to an infraction server S453. This transmission may occur over any wired or wireless form of communication. When the infraction server receives the transmission, the infraction server uses the unique identifier to determine if the wireless communication device associated with the unique identifier is registered to receive notifications S454. If the unique identifier is not registered to receive notifications, the infraction server determines the driver's identification and address S455. The determination may utilize databases of the department of motor vehicles, cellular providers, etc. With the identification and address determined, the notification is delivered to the driver through, for instance, postal mail, e-mail, etc S456. The notification may include information concerning the traffic infraction as well as a fine to be paid. If the unique identifier is registered to receive notifications, then the infraction server determines the identity of the driver and a device address S457. The device address may be a telephone number, IP address, etc. To accomplish the determination, server logic on infraction server compares the unique identifier with a set of unique identifiers corresponding to user accounts stored on a database of the infraction server. The user accounts stored on the database include corresponding driver and device information. With the driver and device information determined, a notification may be sent directly to the driver's wireless communication device S458. The notification may be in the form of a text message, e-mail, voice message, etc. The notification may include information concerning the traffic infraction, a fine levied for the infraction, methods of paying the fine, a link to pay the fine, etc.

Figure 5:
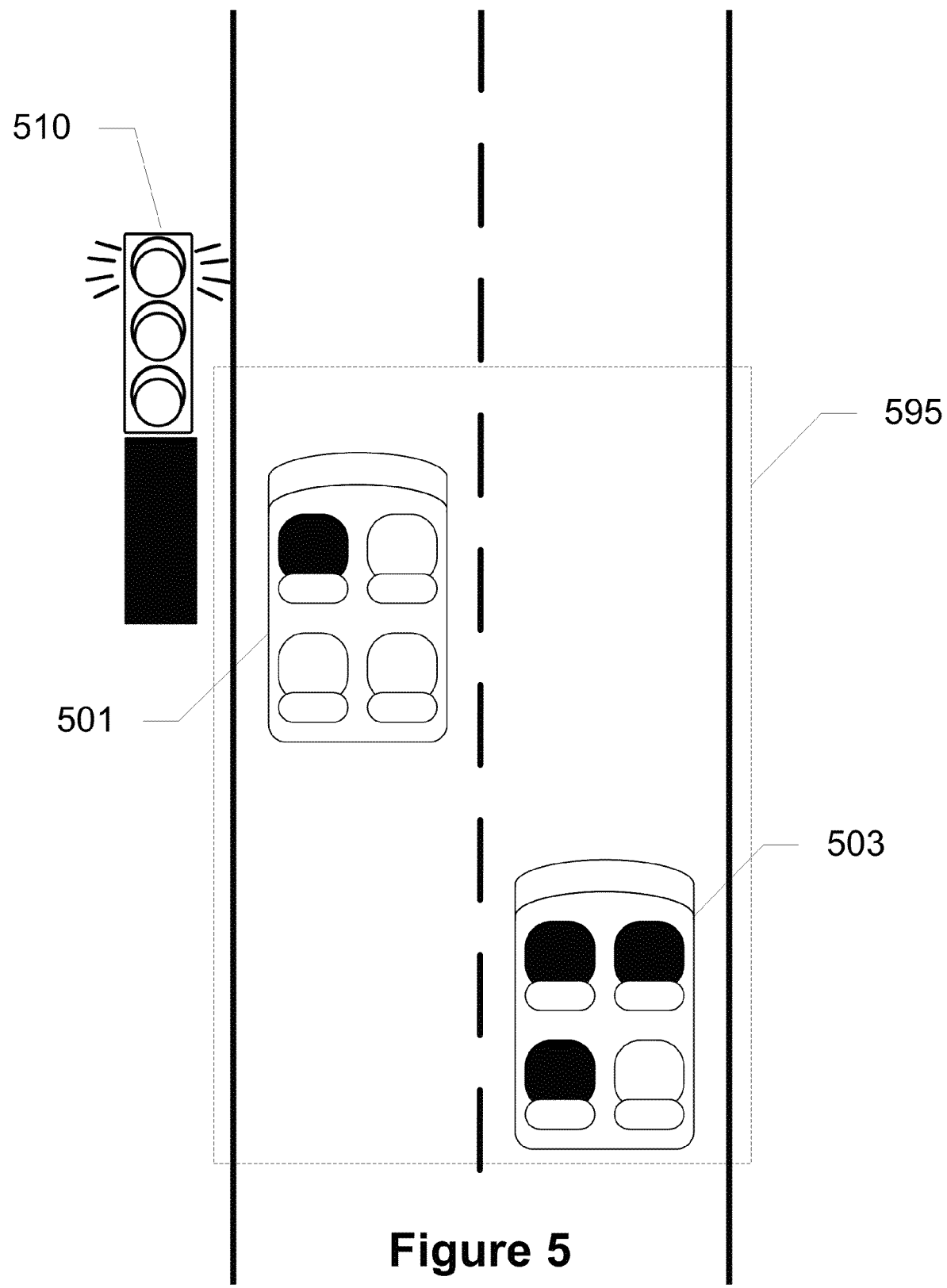
FIG. 5 shows smart vehicles within a registered zone, according to an exemplary embodiment of the present invention.

FIG. 5 shows smart vehicles within a registered zone 595, according to an exemplary embodiment of the present invention. In this embodiment, registered zone 595 is a location within which an infraction detector 510 communicates with wireless communication devices. When a vehicle, such as smart vehicles 501 or 503, travels into registered zone 595, the wireless communication device within the vehicle, or a smart vehicle acting as a proxy for the wireless communication device, receives a request for a unique identifier from infraction detector 510. The wireless communication device, or smart vehicle, transmits the unique identifier back to infraction detector 510 and is registered. Should the vehicle commit a traffic infraction, infraction detector 510 detects the infraction and pairs information concerning the infraction with the unique identifier. The unique identifier serves to locate an address for the device in order to notify the driver of the traffic infraction. For example, smart vehicles 501 and 503 are registered as they enter registered zone 595. Smart vehicle 501 travels through a red light. Infraction detector 510 determines that smart vehicle 501 has run the red light using sensors, such as a camera, motion sensor, etc. Any information concerning the traffic infraction, such as photographs of the incident, is paired with the unique identifier of the wireless communication device of the driver of smart vehicle 501. The unique identifier is used to determine a phone number of the driver's wireless communication device and a notification of the infraction is delivered to the wireless communication device, for example, in the form of a text message. As smart vehicle 503 does not commit an infraction, smart vehicle de-registers as it leaves registered zone 595.

As previously stated, often a vehicle has more than one passenger with a wireless communication device. In these instances, determining the driver of the vehicle may be more difficult for an infraction detector. Thus, embodiments of the present invention include a means for determining a driver within a smart vehicle.

Figure 6:
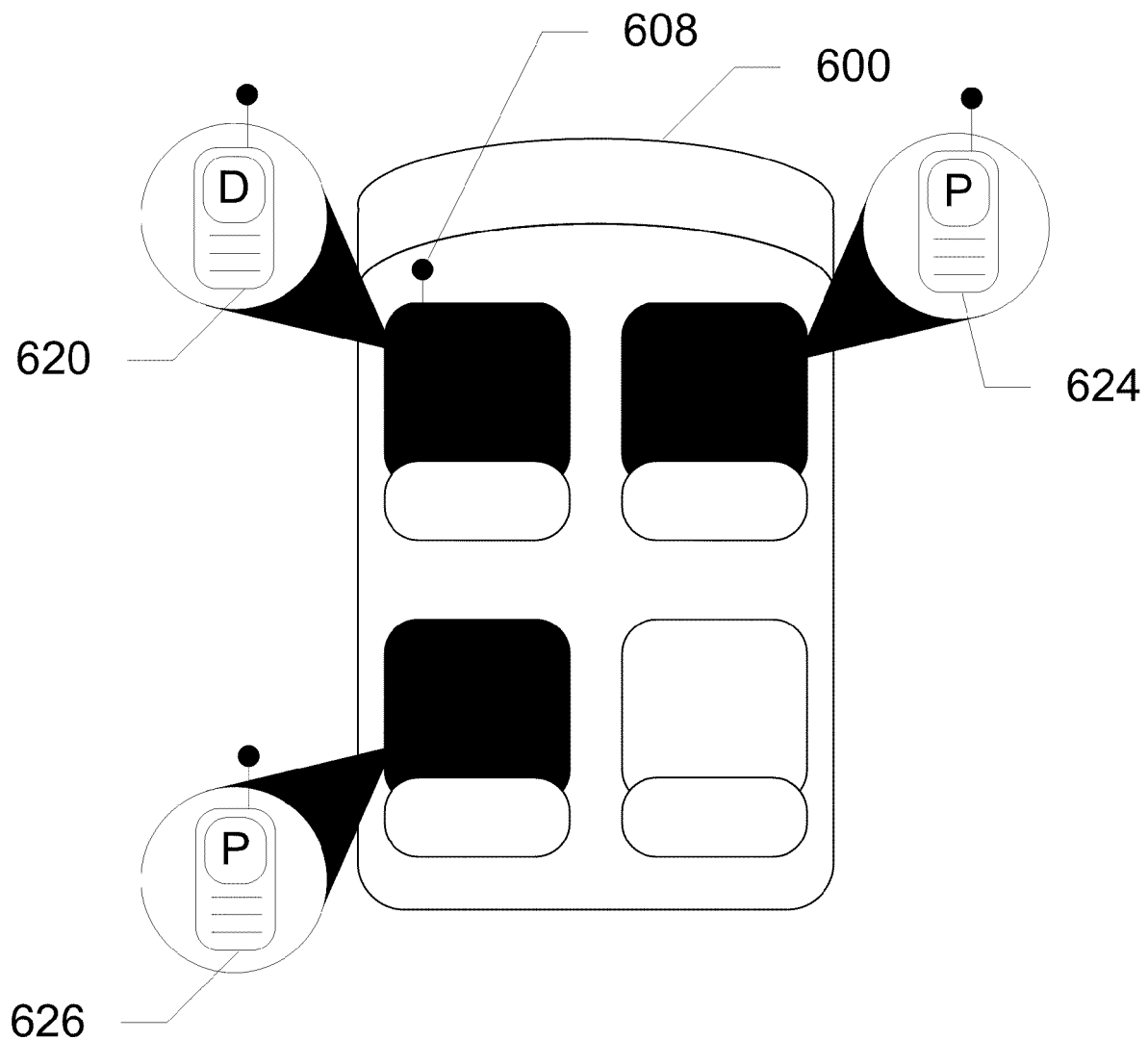
FIG. 6 shows a smart vehicle with multiple occupants, each with a wireless communication device, according to an exemplary embodiment of the present invention.

FIG. 6 shows a smart vehicle 600 with multiple occupants, each with a wireless communication device, according to an exemplary embodiment of the present invention. In this embodiment, smart vehicle 600 is carrying three occupants: a driver, and two passengers. The driver is a user of driver's wireless communication device 620, a front seat passenger is a user of wireless communication device 624, and a backseat passenger is a user of wireless communication device 626.

An antenna 608 and transceiver in smart vehicle 600 are used by client logic on smart vehicle 600 to determine the number of passengers, based upon the number of wireless communication devices located within smart vehicle 600. For instance, wireless communication devices 620, 624, and 626 are detected and smart vehicle 600 determines there is a driver and two passengers. Smart vehicle 600 identifies the driver using the methods described herein, i.e. by capturing a unique identifier from driver's wireless communication device 620. With multiple devices, smart vehicle 600 determines wireless communication device 620 belongs to the driver, as wireless communication device 620 is closest to antenna 608 located near the driver's seat. The determination of a driver versus a passenger may be determined via a proximity measurement derived from signal strength, delay, or other measurements from antenna 608. For instance, as antenna 608 is located closer to the driver seat than the passenger seats, driver's wireless communication device 620 has the strongest communication link to antenna 608, along with the shortest delay. Therefore, a driver is easily determined by placing antenna 608 significantly closer to the driver than any passenger. This ensures that antenna 608 perceives a measurable difference between signals from the driver and signals from a passenger.

The present invention also allows for several secondary means of driver identification. One can conceive of situations where an occupant of a smart vehicle is not instantly detectable. For instance, a wireless communication device may be switched off or a battery dies. The wireless communication device may be placed in a purse or bag and put in the back seat, or another part of the smart vehicle, or held by a passenger. The device may be shared by multiple users, such members of a family. This can result in mistaken driver identification. Therefore, embodiments of the smart vehicle include a plurality of secondary identification means, including biometrics and weight sensors. These backup means for driver and passenger identification introduce a redundancy to the present invention, allowing the infraction detector to determine the correct driver and notify and/or fine the appropriate driver.

Figure 7:
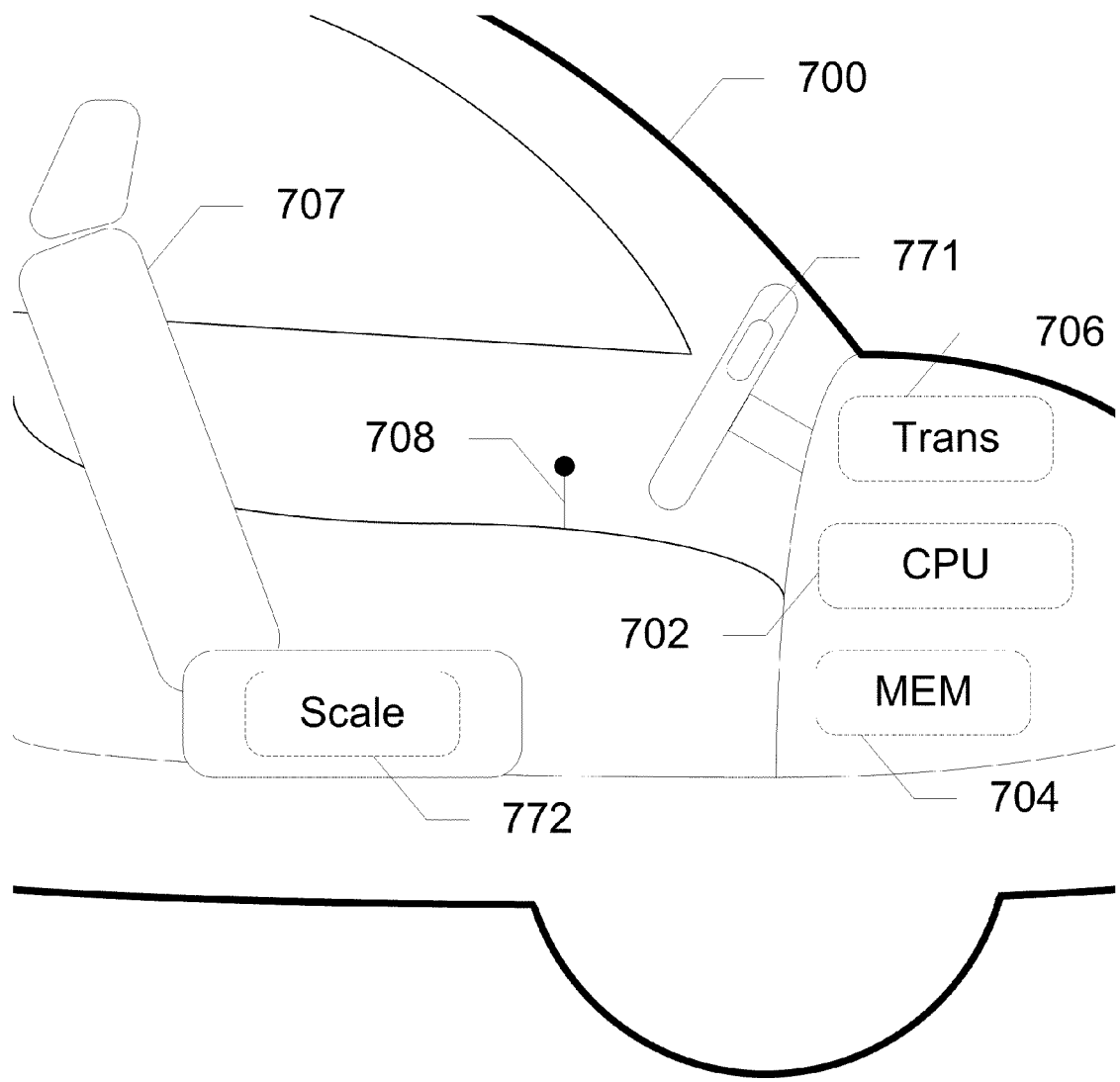
FIG. 7 shows secondary means for verifying a driver's identity, according to an exemplary embodiment of the present invention.

FIG. 7 shows secondary means for verifying a driver's identity, according to an exemplary embodiment of the present invention. Smart vehicle 700 comes equipped with a CPU 702, a memory 704, a transceiver 706, an antenna 708, and a driver seat 707. As described above, CPU 702, based on logic stored on memory 704, controls transceiver 706 to detect the presence of, and unique identifiers from, any wireless communication devices located within smart vehicle 700. A driver's wireless communication device is identified by its relative proximity to antenna 708, which is positioned significantly closer to driver seat 707 than any other seat in smart vehicle 700.

However, in the case that an identity of a driver cannot be ascertained, smart vehicle 700 includes a plurality of secondary sensors. These include a biometric identifier 771, for instance, a fingerprint scanner placed on the steering wheel. A database of drivers' fingerprints is stored on memory 704 or externally on a network, and the detected fingerprint is associated with a driver's identity. Although this can be used for security purposes (such as starting the smart vehicle, reporting a stolen vehicle, etc.) or for convenience purposes (such as adjusting the seat back/position/mirrors based on the identified driver), the present invention uses this biometric identifier to associate the driver with a user account associated with the driver. Thus, if the driver's wireless communication device is switched off or undetectable, the driver can still be determined and notified of a traffic infraction.

Smart vehicle 700 further includes a weight scale 772 coupled to driver seat 707. Weight scale 772 determines a weight of a driver. Weight scale 772 can include a strain gauge, piezoelectric sensor, etc. The measured weight serves several purposes including identifying whether or not a driver is present in smart vehicle 700. Using this, a false driver identification is avoided even if a passenger's wireless communication device is detected to be in proximity of antenna 708. Further, a particular weight or range of weights can be programmed to correspond to specified driver profiles, such that smart vehicle 700 is aware which driver is driving smart vehicle 700, and thereby transmits the appropriate driver's identity to the infraction detector. Combinations of these secondary sensors are possible, and will be apparent to one skilled in the art in light of this disclosure.

Figure 8A:
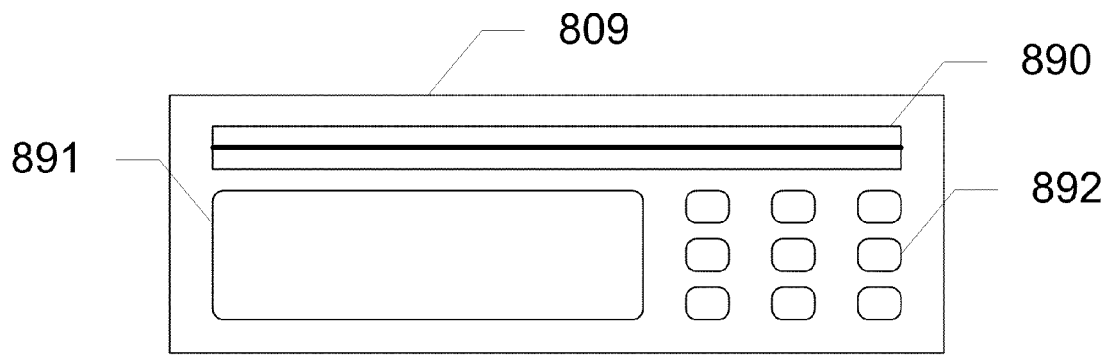
FIGS. 8A and 8B show an aftermarket smart vehicle upgrade, according to an exemplary embodiment of the present invention.
Figure 8B:
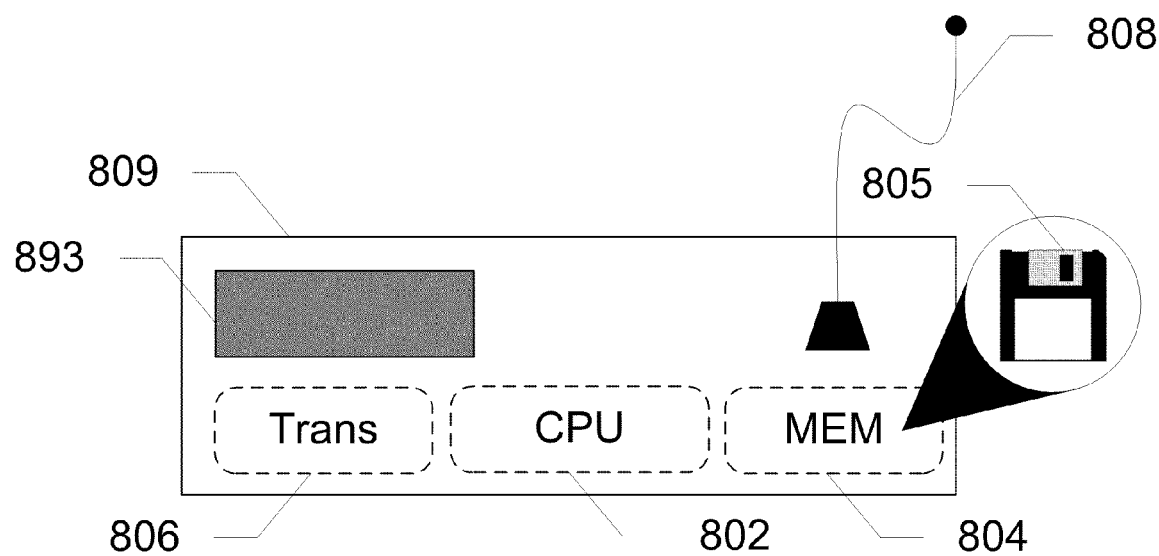

The above embodiment disclosed a smart vehicle having an in-dash transceiver, processor, and memory to relay a unique identifier of a driver's wireless communication device to an infraction detector. However, the present invention allows for the entire functionality of the smart vehicle to be incorporated into a single aftermarket unit that can be used to upgrade any basic vehicle into a smart vehicle. FIGS. 8A and 8B show such an aftermarket smart vehicle upgrade 809, according to an exemplary embodiment of the present invention. Upgrade 809 mimics the form factor of traditional in-dash head units such as CD players or car audio receivers, and includes a display 891, a control panel 892, and can also include a disc-reader 890. Display 891 is any LCD or equivalent display, control panel 892 includes buttons, sliders, etc., and disc reader 890 can play audio and data discs such as CDs, DVDs, etc. The inner components of upgrade 809 include a CPU 802, a memory 804 having client logic 805 stored therein, a transceiver 806, an antenna 808, and a wire harness 893. The functions of CPU 802, memory 804, transceiver 806, and antenna 808 in the aftermarket unit are substantially similar to the functions of the equivalent components of the smart vehicle, which have been amply described above. Note that the placement of antenna 808 is flexible, thereby allowing a user to configure the upgrade to conform to a particular vehicle. Antenna 808 has a long wire connecting it to upgrade 809 allowing antenna 808 to be placed near the driver's seat inside vehicle.

Wire harness 893 provides an interface to other components of a vehicle.

In traditional in-dash head units, wire harnesses 893 provide an interface to the speakers, amplifiers, fuse boxes, and other electrical systems of a vehicle. In this embodiment, wire harness 893 can further provide an interface to various sensors within the vehicle, such as speedometers, external transceivers, biometric/weight sensors embedded in the seats, etc. A driver who installs upgrade 809 in their vehicle can program driver information directly into upgrade 809 via display 891 and control panel 892.

A wireless communication device includes many devices having a processor, memory, and transceiver. A contactless smart card includes all of the above, and in some embodiments, can be integrated into any object that a driver or passenger carries around all the time. Thus, no extra effort is needed to ensure that the wireless communication device is on the user's person at all times. For instance, a contactless smart card can be embedded in a user's driver's license. Since the driver is required by law to carry positive identification at all times while driving, a smart vehicle equipped with a contactless smart card reader will always be able to determine the driver's identity.

FIGS. 9A and 9B show a contactless smart card embedded in a driver's license 960, according to an exemplary embodiment of the present invention. Driver's license 960 includes embedded within it a CPU 962, a memory 964 having wireless logic 965 stored therein, a transceiver 966 and an antenna 968. CPU 962 controls the sending and receiving of signals via transceiver 966 based on wireless logic 965 stored on memory 964. Antenna 968 receives RF signals from the smart vehicle or infraction detector and transmits them to transceiver 966. Antenna 968 further acts as an inductor to capture the RF signal from the smart vehicle or infraction detector, rectify it, and thereby power the other components. In an alternative embodiment, the contactless smart card includes a power supply, thereby allowing driver's license 960 to communicate across greater distances. Memory 964 additionally stores a unique identifier for the driver. Upon receiving an RF query from the smart vehicle or infraction detector, logic 965 retrieves the stored unique identifier and transmits it to the smart vehicle or infraction detector via transceiver 966.

FIG. 10 shows a smart vehicle 1000 detecting a driver's license 1060, according to an exemplary embodiment of the present invention. Driver's license 1060, including wireless logic 1065, is in communication with an antenna 1008 of smart vehicle 1000. Client logic 1005 onboard smart vehicle 1000 enables antenna 1008 to transmit an RF query within smart vehicle 1000. The RF query is sensed by an antenna of driver's license 1060. Wireless logic 1065, in response, transmits a unique identifier corresponding to the driver's identity back to client logic 1005. As described in the embodiments above, client logic 1005 determines that the unique identifier corresponds to a driver's identity, depending on the placement of antennas 1008, and the strength and/or latency of the received signal. Upon a determination of the driver's identity, this information can be transmitted to an infraction detector to register the vehicle. With the vehicle registered, the driver may be notified of traffic infractions committed. If the unique identifier of driver's license 1060 is further associated with a wireless communication device of the driver, the driver may be notified of the traffic infraction through the wireless communication device.

Figure 11:
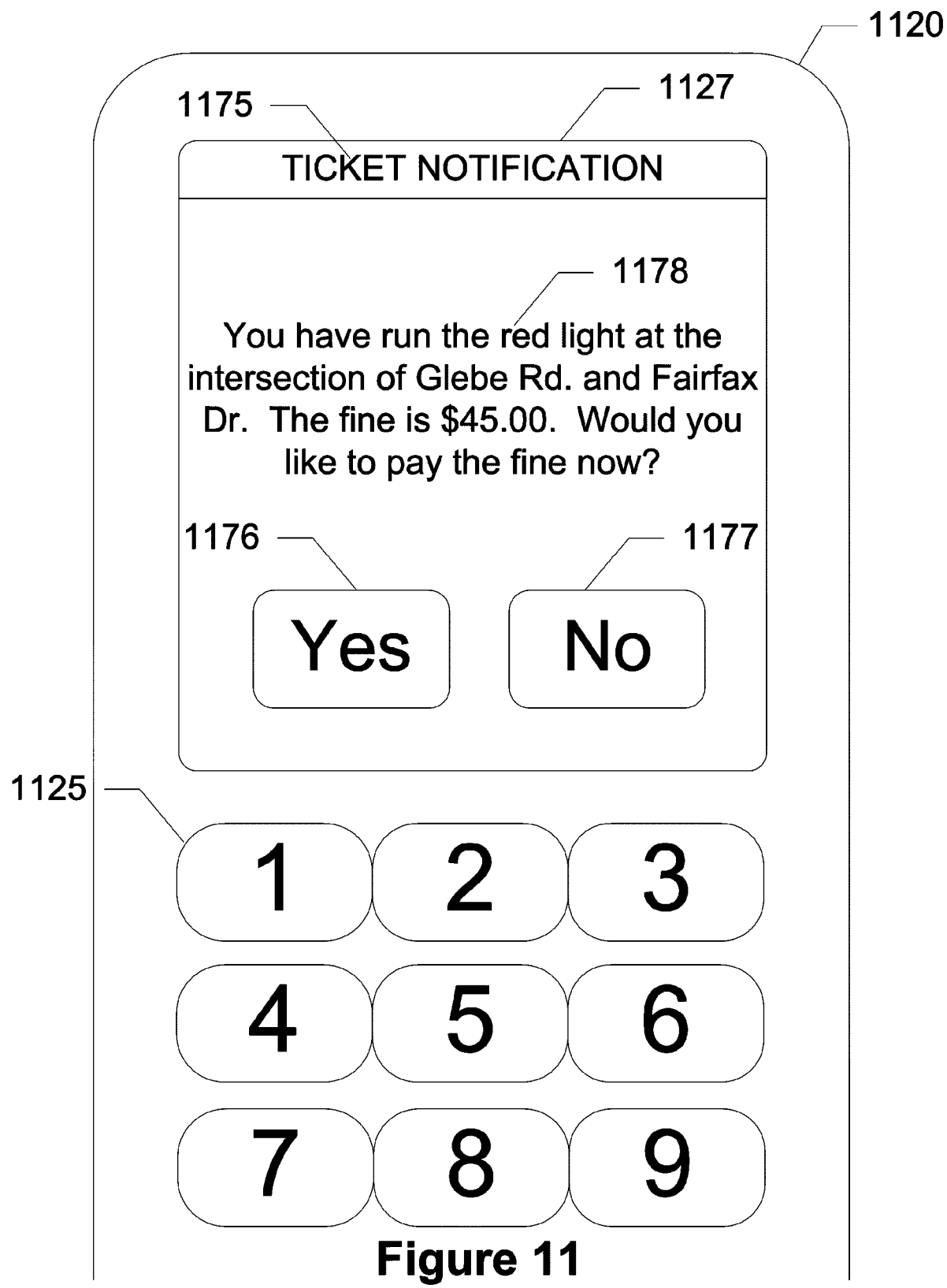
FIG. 11 shows a ticket notification transmitted to a wireless communication device, according to an exemplary embodiment of the present invention.

FIG. 11 shows a ticket notification 1175 transmitted to a wireless communication device 1120, according to an exemplary embodiment of the present invention. In this embodiment, wireless communication device 1120 belongs to the driver of a smart vehicle who has committed a traffic infraction. Ticket notification 1175 notifies the driver that the driver has committed the traffic infraction. For instance, text 1178 of notification states that the driver ran through a red light at the intersection of Glebe Rd. and Fairfax Dr. Text 1178 further states the fine for the infraction and queries the driver whether or not the driver wishes to pay. The driver may be able to pay through ticket notification 1175 if a bank account or credit card of the driver is linked to the unique identifier of wireless communication device 1120. Wireless communication device 1120 includes a screen 1127 and a keypad 1125. Screen 1127 displays ticket notification 1175. To advance to a payment screen, ticket notification 1175 includes a 'Yes' button 1176 and a 'No' button 1177. Selecting 'Yes' button 1176 confirms that the driver wishes pay the fine. Selecting 'No' button 1177 confirms that the driver does not wish pay the fine at that time. Keypad 1125 allows the driver to input an acceptance or denial of the payment at that time.

Figure 12:
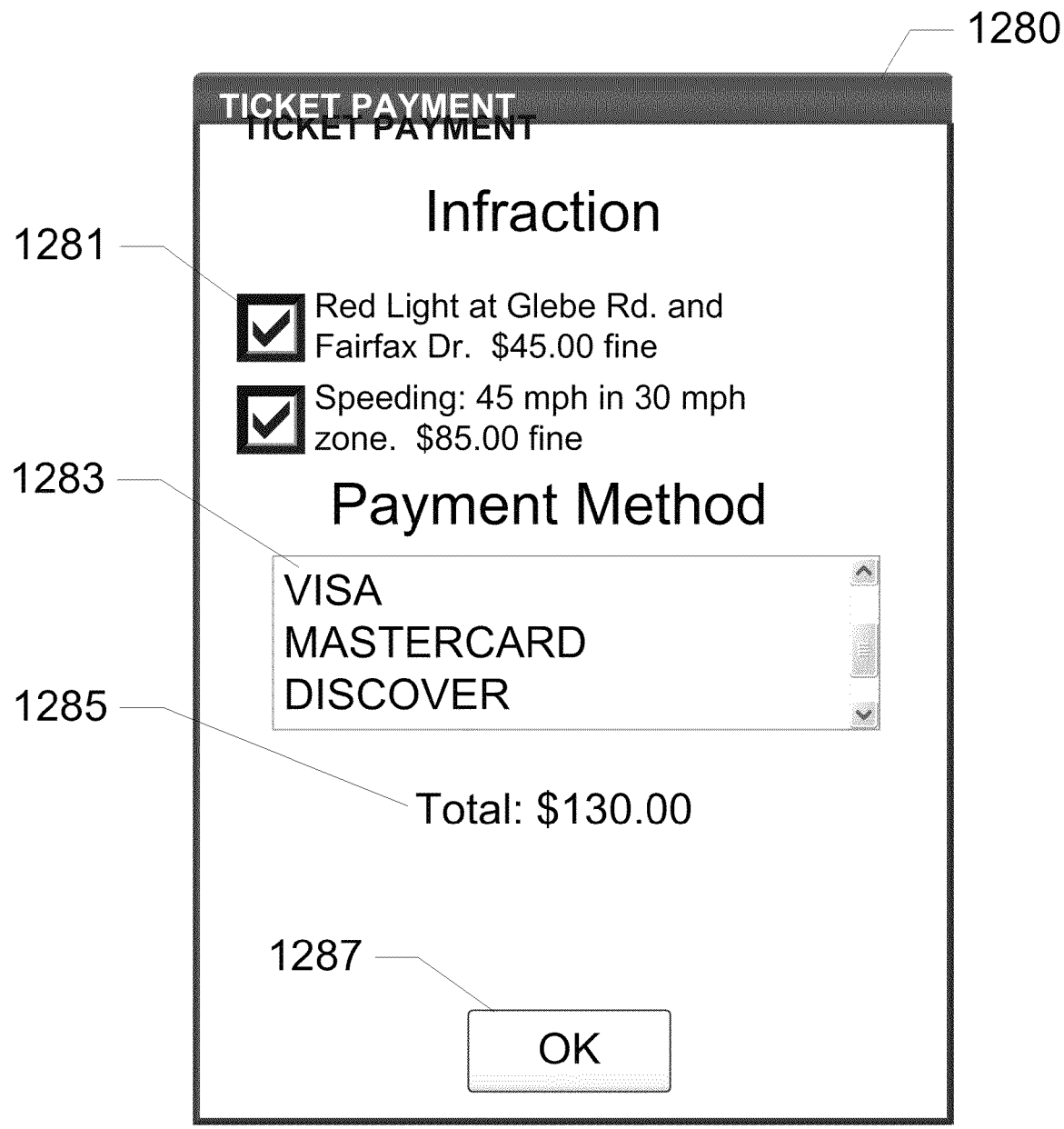
FIG. 12 shows a screenshot of a ticket payment application, according to an exemplary embodiment of the present invention.

FIG. 12 shows a screenshot of a ticket payment application 1280, according to an exemplary embodiment of the present invention. In this embodiment, ticket payment application 1280 includes an infraction listing 1281, a payment method 1283, a total fine 1285, and a confirmation button 1287. Infraction listing 1281 provides a list of traffic infractions committed by a driver associated with the account. The traffic infractions include details of the infraction, such as the location, as well as the amount of the fine associated with the traffic infraction. The driver may select which infraction he or she wishes to pay with ticket payment application 1280. Payment method 1283 allows the driver to select how he or she wishes to pay for the selected infractions. Payment method 1283 may include a credit card, a bank account, a cellular provider, etc. Each of these payment methods may be saved or entered in order to submit a payment. Total fine 1285 displays the total amount of the selected infractions which are to be charged to payment method 1283. Confirmation button 1287 sends a payment for total fine 1285 to a payment server.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for notifying a driver, the system comprising:
   a network;
   an infraction detector in communication with the network, the infraction detector for determining a traffic infraction by a vehicle and recording information concerning the traffic infraction;
   a wireless communication device in communication with the infraction detector;
   an infraction server on the network, the infraction server including a user account for a user of the wireless communication device corresponding to a unique identifier of the wireless communication device, the user account including an address of the user;
   an infraction logic on the infraction detector to retrieve the unique identifier from the wireless communication device, pair the unique identifier with the information concerning the traffic infraction, and transmit the unique identifier and details of the traffic infraction to the infraction server; and
   a server logic on the infraction server to associate the unique identifier with the user account, determine the address for the user, and send a notification of the traffic infraction to the address;
   wherein the address is an address of the wireless communication device and the infraction server sends the notification to the address in one or more of an e-mail, a voice call, or a text message.

2. The system of claim 1, wherein the infraction detector further comprises a Doppler radar unit to detect a speed of the vehicle.

3. The system of claim 1, wherein the infraction detector is in communication with a traffic light.

4. The system of claim 1, wherein the unique identifier is one or more of a MSISDN, a IMSI, and a MAC address.

5. The system of claim 1, wherein the infraction detector retrieves the unique identifier using short range wireless communication.

6. The system of claim 1, wherein the vehicle is a smart vehicle having client logic to proxy the wireless communication device by receiving the unique identifier from the wireless communication device and sending the unique identifier to the infraction detector.

7. The system of claim 6, wherein the smart vehicle further comprises a biometric sensor in the smart vehicle to determine an identity of the user.

8. The system of claim 1, wherein the wireless communication device is a contactless smart card.

9. A method for notifying a driver, the method comprising:
   requesting a unique identifier from a wireless communication device;
   receiving the unique identifier from the wireless communication device;
   determining a vehicle has committed a traffic infraction by detecting a speed of the vehicle using a Doppler radar unit;
   correlating the vehicle with the unique identifier;
   determining an identity of a driver in possession of the wireless communication device and a driver address based upon the unique identifier by sending the unique identifier to an infraction server and matching the unique identifier with a user account; and
   notifying the driver of the traffic infraction by selecting an address from the user account; and
   sending a notification to the address;
   wherein the address is an address of the wireless communication device.

10. The method of claim 9, wherein the determining the vehicle has committed the traffic infraction further comprises optically sensing the vehicle running a red light.

11. The method of claim 9, wherein the receiving the unique identifier is accomplished through short range wireless communication.

12. The method of claim 9, further comprising sending one of an e-mail and a text message to the wireless communication device.

13. An infraction detector, comprising:
   a sensor;
   a processor in communication with the sensor;
   a memory in communication with the processor;
   a transceiver in communication with the processor;
   an antenna coupled to the transceiver; and
   an infraction logic on the memory to
      retrieve a unique identifier from a wireless communication device via the antenna and transceiver,
      determine a traffic infraction through inputs from the sensor,
      correlate the unique identifier with the traffic infraction, and
      send the unique identifier and traffic infraction to an infraction server,
   wherein the infraction server determines a user of the wireless communication device and an address for the user based upon the unique identifier and sends a notification to the user;
   wherein the address is an address of the wireless communication device and the infraction server sends the notification to the address in one or more of an e-mail, a voice call, or a text message.

14. The infraction detector of claim 13, wherein the sensor is a Doppler radar unit.

15. The infraction detector of claim 13, wherein the sensor is a camera.

* * * * *